United States Patent [19]
Fenton

[11] Patent Number: 5,890,180
[45] Date of Patent: Mar. 30, 1999

[54] METHOD AND APPARATUS FOR PRODUCING A SPECIFIC MANUAL FOR CONFIGURABLE ELECTRONIC EQUIPMENT

[75] Inventor: Shaun Fenton, Basingstoke, Great Britain

[73] Assignee: Motorola, Inc., Schaumburg, Ill.

[21] Appl. No.: 719,116

[22] Filed: Sep. 24, 1996

[30] Foreign Application Priority Data

Sep. 27, 1995 [GB] United Kingdom ................ 9519674

[51] Int. Cl.⁶ ....................................... G06F 3/05
[52] U.S. Cl. .............................. 707/530; 707/511
[58] Field of Search .................... 707/513, 530, 707/511, 104; 364/474.24

[56] References Cited

U.S. PATENT DOCUMENTS

| | | | |
|---|---|---|---|
| 4,370,707 | 1/1983 | Phillips et al. ................ | 707/104 |
| 5,144,555 | 9/1992 | Takadchi et al. ............... | 707/530 |
| 5,351,196 | 9/1994 | Sowar et al. .................. | 364/474.24 |
| 5,357,440 | 10/1994 | Talbott et al. ................ | 364/474.24 |
| 5,452,222 | 9/1995 | Gray et al. ................... | 702/122 |
| 5,491,785 | 2/1996 | Robson et al. ................. | 707/513 |
| 5,655,130 | 8/1997 | Dodge et al. .................. | 707/511 |

OTHER PUBLICATIONS

"Something for Every Engineer." CAE 11, No. 12 (Dec., 1992): 60–66.

Primary Examiner—Joseph H. Feild
Assistant Examiner—John L. Young
Attorney, Agent, or Firm—Andrew S. Fuller

[57] ABSTRACT

A specific manual for configurable electronic equipment is produced by providing at least one generic manual; obtaining configuration information relating to the equipment (23); selecting parts of the generic manual applicable to the configuration (28); assembling the selected parts of the generic manual and at least some of the configuration information (24,30,31); and outputting the assembly as the specific manual (25).

7 Claims, 4 Drawing Sheets

METHOD AND APPARATUS FOR PRODUCING A SPECIFIC MANUAL FOR CONFIGURABLE ELECTRONIC EQUIPMENT

TECHNICAL FIELD

This invention relates to a method and apparatus for producing a specific manual for configurable electronic equipment, particularly, but not exclusively, radio or cellular telephony equipment.

BACKGROUND OF THE INVENTION

Transmitter receiver radio equipment commonly includes a keypad and configurable buttons by means of which the equipment may be operated. The equipment usually has the capability to be used for a number of applications for example, conventional applications, where a user selects a transmit and receive channel, or trunked radio applications, where the communication channel is automatically selected from a pool of available channels. The same equipment may be configured to provide either type of application prior to delivery to a user.

It is also usual for such equipment to be programmed to offer the precise functionality that the user requires, for example, a user may wish for depression of certain buttons of the keypad to result in the equipment operating in a particular way. That is to say, the buttons are configured to control certain functionality.

A problem experienced by users of configurable equipment is that the equipment is often accompanied by a user manual which is generic in nature. The manual is designed to cover operation of the equipment in all of the possible different applications. Thus, the user is presented with information much of which may be irrelevant to the way in which the equipment is to be used. Because of this, users are often inhibited from reading the manual and hence, do not discover all of the features that are available on the equipment.

Further, since the equipment is configurable in a number of ways, there will be little if any information in the manual concerning a particular configuration.

Thus, a manual which is provided with the intention of assisting the user too often remains unused and the user does not exploit the full potential offered by the equipment. Therefore, there is a need for a method to generate a specific manual for configurable electronic equipment.

SUMMARY OF THE INVENTION

According to a first aspect of the invention there is provided a method for producing a specific manual for configurable electronic equipment which method comprises the steps of: providing at least one generic manual; obtaining configuration information relating to the equipment; selecting parts of the generic manual applicable to the configuration; assembling the specific manual from the selected parts of the generic manual and at least some of the configuration information; and outputting the specific manual.

By obtaining the configuration information relating to the equipment, it is possible to select text from the generic manual applicable to the configuration and to assemble that text with at least some of the configuration information to produce a manual which is specific to that equipment. The specific manual will accurately reflect the application and configuration of the equipment. If, at a later stage, the configuration is changed then the method can then be repeated to produce a new specific manual.

Once assembled, the specific manual could be printed as a hard copy or stored on a data carrier such as a floppy disk. For some equipment it may be possible to store the manual in memory within the equipment. An on-screen help manual function could then be catered for by the equipment displaying information from the stored specific manual.

According to a second aspect of the invention there is provided apparatus for producing a specific manual for configurable electronic equipment which apparatus comprises: means to determine the configuration of the electronic equipment; memory storing a generic manual; means to select from the generic manual parts which are applicable to the determined configuration; means to assemble at least some of the selected parts with at least some information about the determined configuration to produce a specific manual.

DETAILED DESCRIPTION OF THE PREFERRED EMBODIMENT

Figure 1:
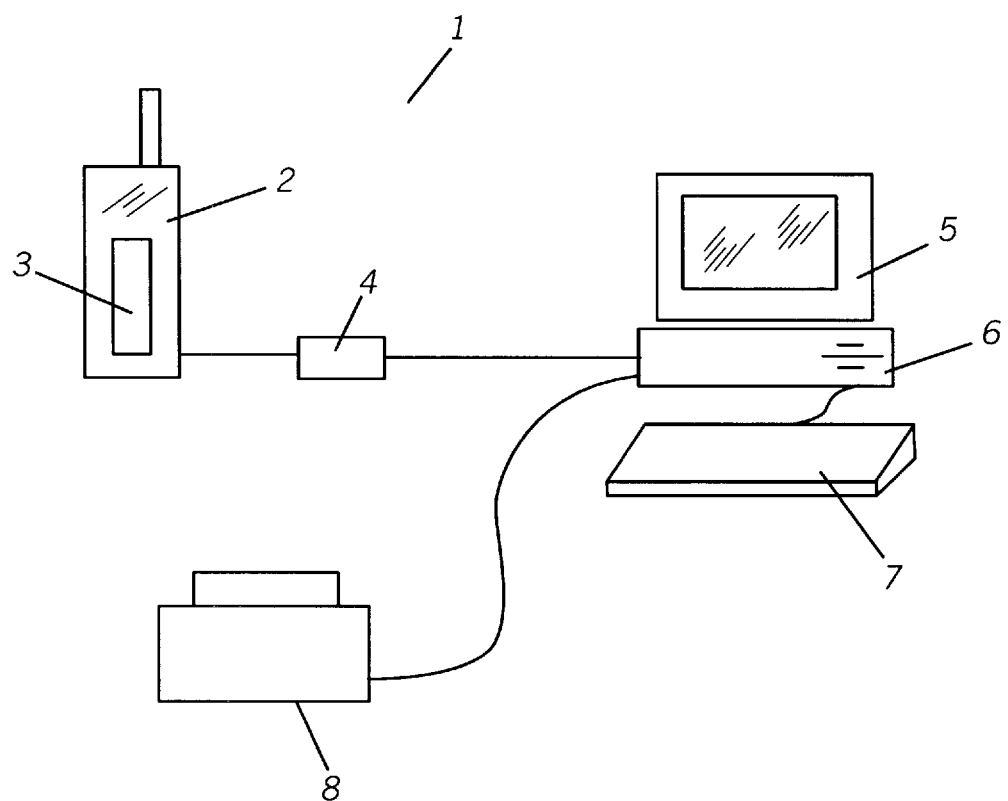
FIG. 1 of the drawings shows in schematic form the apparatus required to produce a specific manual in accordance with an embodiment of the invention.

With reference to FIG. 1, apparatus 1, operating in accordance with the invention, includes an item of configurable equipment, in this case, a hand-held radio transceiver 2 with a keypad 3, a radio interface box (RIB) 4, a computer 5 and a printer 8. The computer 5 includes an internal hard disk drive (not shown), a floppy disk drive 6 and a keyboard 7.

The RIB 4 serves to interface the transceiver 2 to the computer 5. (An interface is necessary because of the voltage difference between signals provided by the transceiver 2 and the voltage required by the computer 5). A lead from the RIB 4 is connected to a socket (not shown), in the transceiver 2. A further lead extends from the RIB 4 to a serial port (not shown) in the computer 5. The way in which the RIB 4 operates will be familiar to those skilled in the art and will not be described in detail.

Figure 2:
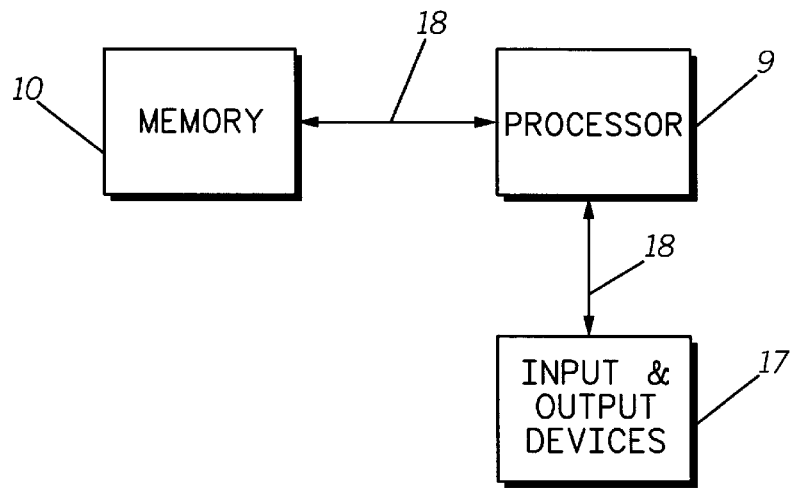
FIG. 2 shows in schematic block diagram form a computer used in the apparatus shown in FIG. 1.

As is shown in FIG. 2, the computer 5 is of a familiar form. It include a processor 9, a memory 10 and input/output devices 17 interconnected by buses 18 in the usual way. As will be appreciated, the memory 10 can be formed from a number of components including solid state memory (in the form of semiconductor chips) internal hard disk and floppy disk drives. The memory 10 provides a number of locations which are accessible by the processor 9. Within the locations are stored hexadecimal numbers. The numbers will be instructions for controlling the operation of the processor 9 (that is to say they are program) and data. The way in which the memory is arranged is illustrated in FIG. 3.

Figure 3:
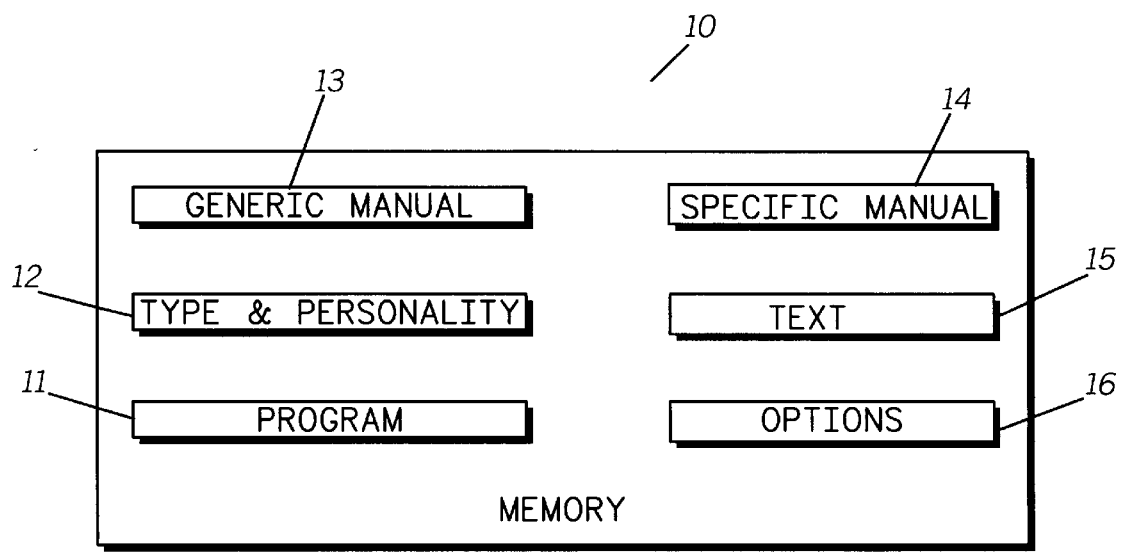
FIG. 3 shows in schematic block diagram form the memory allocation of the computer shown in FIG. 2.

It can be seen from FIG. 3, that the memory 10 has six divisions 11, 12, 13, 14, 15. Division 11 holds the above mentioned program. Division 12 is allocated for holding radio type and personality data. Division 13 holds a generic manual. This is in the form of a file which can be read in blocks, the blocks corresponding to text which is eventually used to provide the specific manual. This manual is generic in the sense that it can serve as the basis for manuals for any configuration of the transceiver 2. Division 14 is allocated for holding the specific manual as it is assembled in a process which will be described later. At the end of the process it will store the complete specific manual for the transceiver 2 ready for copying to disk or for printing as a hard copy manual. Division 15 stores blocks of text copied from the generic manual held in division 13 during the processing step which will be described later. Division 16 stores information on options which have been enabled on the transceiver 2. These options are obtained from the transceiver in a way which be later described.

Figure 4:
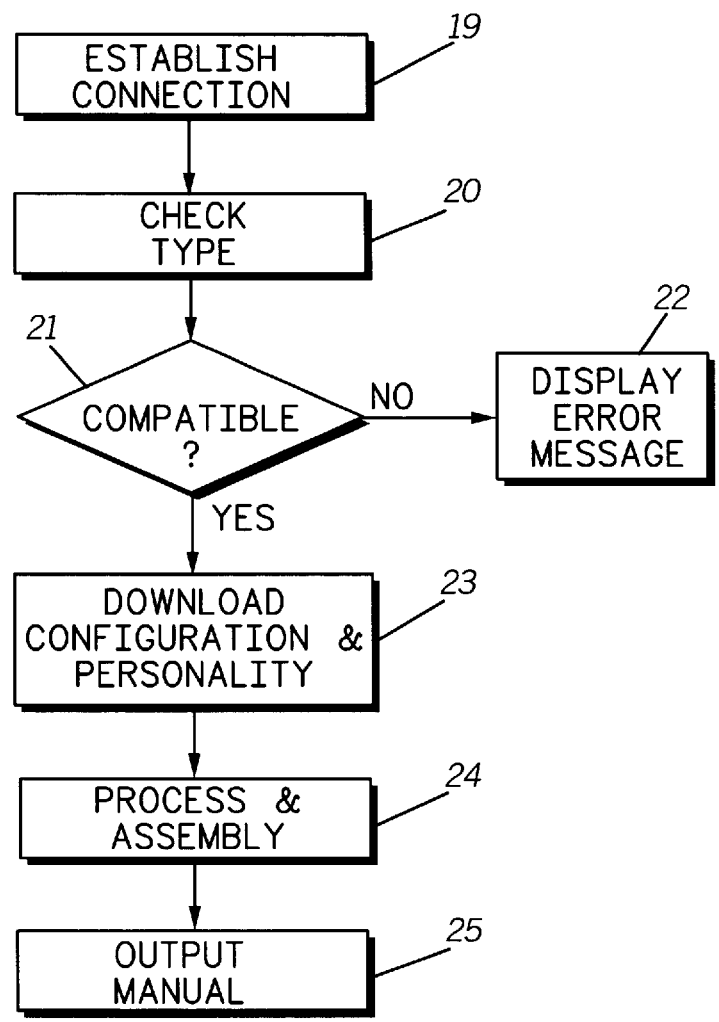
FIGS. 4 and 5 are flow charts of the operation of the apparatus.

The way in which the apparatus 1 operates will now be described with reference to FIG. 4. A first step, as represented by box 19, is for the computer 5 to establish connection with the transceiver 2. When connection has been established a second step, as represented by box 20, is for the computer 5 to determine the type of transceiver that transceiver 2 is. The determined type is then compared with a list of compatible types defined in the program in order to determine whether or not it is compatible with the program, as represented by decision diamond 21. If the transceiver 2 is not a compatible type, then an error message is displayed on a display of the computer 5 in a step represented by box 22. The error message will be "Equipment not recognized contact help line".

If the transceiver 2 is a compatible type, then the computer 5 requests information about its configuration and "personality". This step is represented by box 23 of FIG. 4. and can be considered as a downloading step. By "personality" it is meant the way in which options provided by the transceiver 2 are allocated to buttons on the keypad 3. This information is stored in memory (not shown) within the transceiver 2 and copied to division 12 of the computer memory 10.

In a further step, as represented by box 24, the configuration and personality information is processed and a specific manual assembled. After step 24 the specific manual can be output to disk or hard-copy as required (by means of disk-drive 6 or printer 8) in a step represented by box 25.

Figure 5:
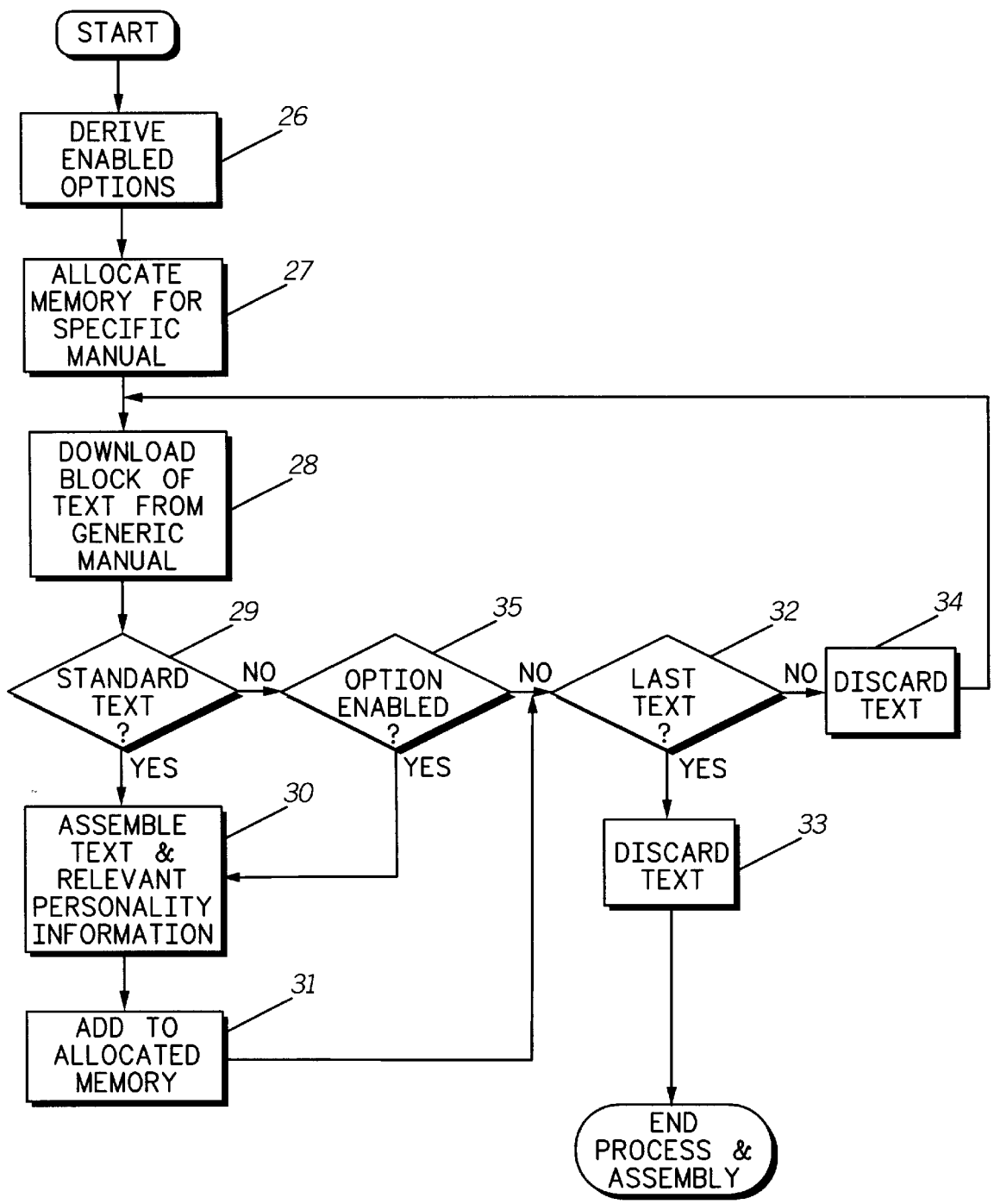

The step 24 of processing and assembly of the specific manual will now be described in greater detail with reference to FIG. 5. A first step in the process will be to derive the enabled options on the transceiver 2. This step is represented by box 26 in FIG. 5. The options are obtained from the type and personality information stored in memory division 12 and then stored in memory division 16. A second step in the process is to allocate memory in memory 10 for holding a specific manual as it is generated. This step is represented by box 27 and the allocated memory is memory division 14. A next step, as represented by box 28, is to download a block of text from the generic manual in memory division 13 to a memory division 15 allocated for the storage of blocks of text during the assembly process.

As represented by decision diamond 29, consideration is next given as to whether the downloaded block is standard text (by standard text it is meant that the text is for use in all specific manuals). For example, it could be introductory paragraphs applicable to equipment whichever way it is configured. The text will include a flag (which is not printed) marking the text as standard or optional.

If the text is standard, then any relevant information to be incorporated into the text is copied from the type and personality information held in memory division 12, as represented by box 30. This will complete the assembly of the block of text and it will then be added to memory division 14, as represented by box 31. As represented by decision diamond 32, consideration is given to whether or not the text block just processed is the last block of text. If it is the last block of text then the next step will be to clear the memory division 15 by discarding the stored text, as represented by box 33. The specific manual will then be complete and the next step will be to output the manual (step 25 of FIG. 4). If the text is not the last text then the memory division 15 is cleared by discarding its contents, as represented by box 34, and the next block of text downloaded by returning to step 28. The next block of text is processed as before.

If the text is non-standard, it will be necessary to consider whether it relates to an option which is enabled on the transceiver. This step is represented by decision diamond 35. In this step, a flag in the block of text is compared with the option information held in memory division 16. If there is a match, then that option has been enabled and the next step will be step 30 which was described earlier.

This time step 30 results in the text concerning the option to be assembled with any relevant information concerning the option held in the type and personality memory division 12. For example, button one of key-pad 3 may have been programmed to establish connection to a particular base-station. The block of text relating to this option as obtained from the generic manual would then be:

"Button( ) of the keypad has been pre-programmed to call ( )."

( ) denotes a space allowed for the insertion of further text. After the assembly step 30 the text would be:

"Button 1 of the keypad has been pre-programmed to call the base-station."

The completed text is then added to the specific manual memory division 14. Whether this text is the last text of the manual is then considered as before in step 32. If the text is the last block then the text is discarded from memory division 15, step 33 and the next step will be to output the manual (step 25 of FIG. 4). If the text is not the last, then the text is discarded step 34 and the next block of text downloaded by returning to step 28.

At the output manual step 25, the specific manual generated by the process and assembly process 24 and stored in memory division 14 is output either to disk or printed as a hard copy by means of printer 8. An option will be presented to a user of the apparatus on the display of computer 5 to output the manual via the printer or to disk.

In the above described embodiment there is provided one generic manual to cater for all possible configurations of equipment. In alternative embodiments there may be provided more than one generic manual perhaps to cater for different types of equipment. For example, there may be a generic manual for cellular telephony equipment, and another for conventional radio equipment.

What is claimed is:

1. A method for producing a specific manual for configurable electronic equipment, the method comprising the steps of:

providing at least one generic manual;

obtaining configuration information relating to the equipment by communicating directly with the configurable electronic equipment to read configuration parameters;

selecting parts of the generic manual applicable to the configuration information;

assembling the specific manual from the selected parts of the generic manual and at least some of the configuration information; and outputting the specific manual.

2. The method of claim 1, further comprising the steps of:

determining from the obtained configuration information a set of options enable on the electric equipment; and selecting from the generic manual parts which are applicable to at least some of the set of options.

3. The method of claim 2, wherein two or more generic manuals are provided, and further comprising a step of selecting the generic manual which is appropriate to the equipment prior to the step of selecting parts of the generic manual applicable to the configuration.

4. The method of claim 1, wherein two or more generic manuals are provided, and further comprising a step of selecting the generic manual which is appropriate to the equipment prior to the step of selecting parts of the generic manual applicable to the configuration.

5. Apparatus for producing a specific manual for configurable electronic equipment comprising:

means to determine the configuration of the electronic equipment by communicating directly with the configurable electronic equipment to read configuration parameters;

memory storing a generic manual;

means to select from the generic manual parts which are applicable to the determined configuration; and means to assemble at least some of the selected parts with at least some information about the determined configuration to produce a specific manual.

6. The apparatus of claim 5, further comprising:

means to obtain from the configuration of the electronic equipment a set of options enabled on the equipment; and means to select from the generic manual parts which are applicable to at least some of the enabled options; and means to assemble the selected parts into the specific manual.

7. In a computer, a method for automatically producing a specific manual for operating configurable electronic equipment, the method comprising the steps of:

obtaining configuration information for the configurable electronic equipment by communicating directly with the configurable electronic equipment to read configuration parameters for the purpose of producing the specific manual;

upon obtaining the configuration information, automatically:

accessing a generic manual containing descriptions for potential configurations of the equipment;

selecting portions of the generic manual based on the configuration information obtained;

assembling the specific manual from the selected portions of the generic manual and at least some of the configuration information; and outputting the specific manual.

* * * * *